B. B. HOTCHKISS.
SHELL AND SHELL FUSE.

No. 244,899.    Patented July 26, 1881.

2 Sheets—Sheet 1.

Attest,
Geo. W. Graham
John Boleschka

Inventor,
Benjamin B. Hotchkiss,
by Munson & Philipp,
Attys.

B. B. HOTCHKISS.
SHELL AND SHELL FUSE.

No. 244,899. Patented July 26, 1881.

Attest,
Geo. H. Graham
John Boleschka

Inventor,
Benjamin B. Hotchkiss,
by Munson & Philipp,
Attys.

UNITED STATES PATENT OFFICE.

BENJAMIN B. HOTCHKISS, OF NEW YORK, N. Y.

SHELL AND SHELL-FUSE.

SPECIFICATION forming part of Letters Patent No. 244,899, dated July 26, 1881.

Application filed December 29, 1879.

*To all whom it may concern:*

Be it known that I, BENJAMIN B. HOTCHKISS, of the city, county, and State of New York, now temporarily residing in Paris, France, have invented certain new and useful Improvements in Fuses and Projectiles, of which the following is declared to be such a full, clear, and exact description, when taken in connection with the accompanying drawings, as will enable those skilled in the art to make and use the same.

The main object of this invention is the production of a percussion-fuse that is absolutely effective when it is to operate in igniting the bursting-charge of an explosive projectile, and yet be perfectly secure against accidental or premature discharge during transportation or handling, said fuse at the same time being capable of automatic action, and not requiring any manipulation to arm it before the discharge of the projectile to which it is applied.

The invention comprehends a fuse so constructed that its firing-plunger shall at all times before the discharge of the projectile from the gun support the firing-pin and the primer out of contact with each other, and under the shock of the propelling-charge of the gun be capable of so changing its relation with respect to the firing-pin and primer that when the projectile is brought into forcible contact with any body the said plunger shall be suddenly moved forward and carry the firing-pin and primer into percussive contact to produce the ignition of the latter and cause the explosion of the bursting-charge in the body of the projectile. A fuse embodying these characteristics is especially adapted to serve as a butt-fuse; and another object of the invention is the construction of a simple and comparatively cheap projectile with which a butt-fuse is adapted to be used, and by which arrangement perfect operation of the fuse may be insured, no matter at what angle of deflection the projectile may strike.

In the accompanying drawings various embodiments of the improvements are represented.

Figure 1:
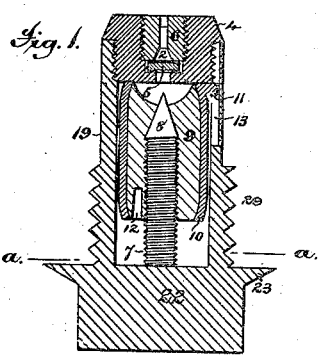
Figure 4:
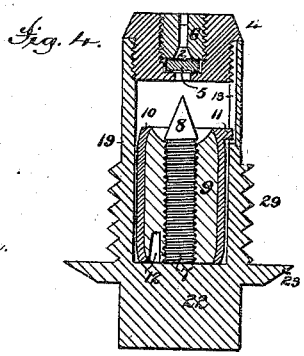
Figure 6:
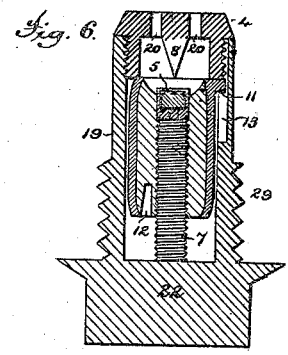
Figure 3:
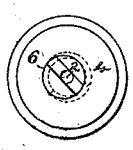
Figure 2:
Figure 5:
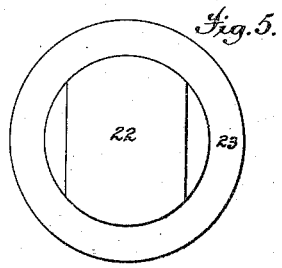
Figure 7:
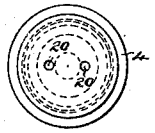
Figure 8:
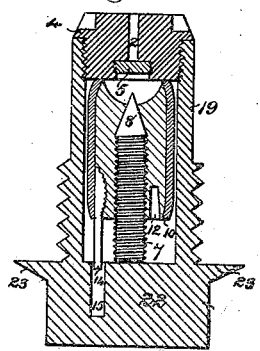
Figure 9:
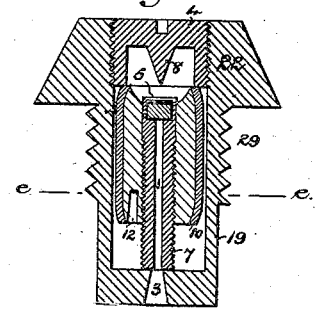
Figure 10:
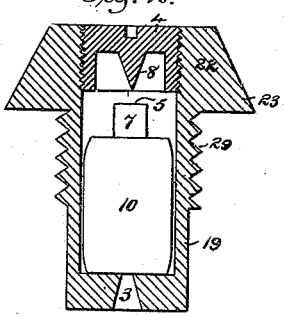
Figure 11:
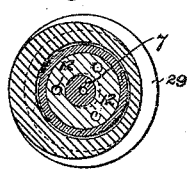
Figure 13:
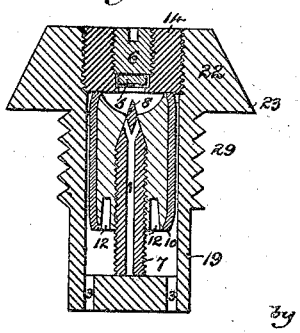
Figure 12:
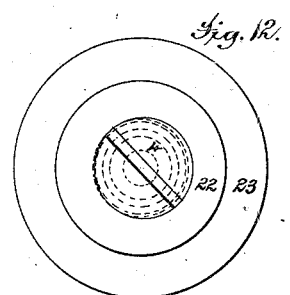
Figure 14:
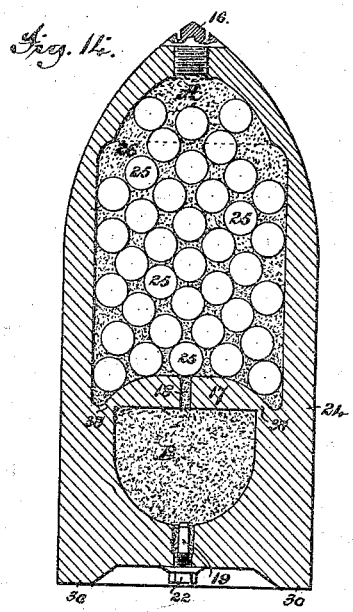
Figure 15:
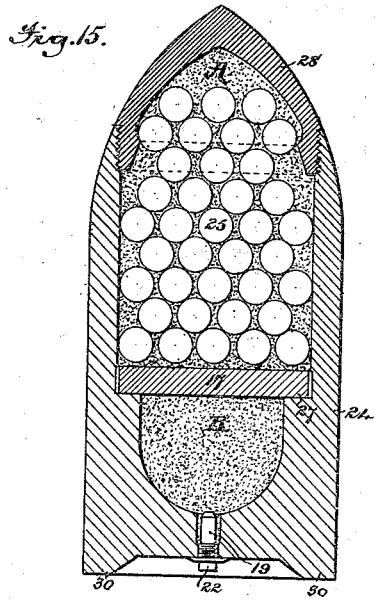

Figure 1 is a sectional elevation of a fuse adapted to be mounted in the butt-end of a projectile, the plunger and firing-pin standing in the positions in which they are movable relatively to the fuse-case—that is, said parts are in the positions occupied when inserted in the projectile, and in which they remain until the moment the projectile is discharged. Fig. 2 is an inverted plan view of the same on line $a\ a$ of Fig. 1. Fig. 3 is a plan view of the upper end of the fuse. Fig. 4 is a sectional elevation of said fuse, showing the position assumed by the plunger relative to the firing-pin and fuse-case upon the discharge of the projectile. Fig. 5 is a plan view of the base of the fuse. Fig. 6 is a sectional elevation, showing a modification of the internal structure of the fuse. Fig. 7 is a plan view of the upper end of the same. Fig. 8 is a sectional elevation of another modification of the internal structure of this improved fuse. Fig. 9 is a sectional elevation of another modification of the internal structure of the fuse, the construction being such as to adapt it to be applied to the nose end of a projectile, its internal structure being modified, as is that shown in Fig. 6, and the parts thereof being in the positions occupied before the discharge of the projectile. Fig. 10 is a sectional elevation of the same, showing the parts in the positions assumed upon the discharge of the projectile. Fig. 11 is a plan view of the same on the line $e\ e$ of Fig. 9. Fig. 12 is a plan view of the upper end of the same. Fig. 13 is a sectional elevation, showing a modification of this latter fuse. Fig. 14 is a longitudinal sectional elevation of an improved shrapnel projectile provided at its butt-end with this improved fuse. Fig. 15 is a similar view of a like projectile provided at its butt-end with this improved fuse.

Before proceeding to a detailed description of the precise structure of the various modifications containing the improvements, it may be observed that one of the principal parts of the fuse—that is, either the firing-pin or the primer—is carried by a comparatively heavy body, which, under certain circumstances, is capable of a short movement in the chamber of the fuse-case on a line parallel with the axis of the projectile to which the fuse is applied. This heavy body is the plunger, which, in consequence of its inertia, effects, first, the arming of the fuse at the moment of the discharge of the gun, and afterward the ignition of the primer when the projectile is suddenly arrested by resistance to its flight, while before the discharge the said plunger is firmly held in a position that prevents accidental contact of the firing-pin with the primer, or vice versa. This plunger is composed of three parts: first, a body, 9, of soft metal, such as lead; second, a jacket or envelope, 10, of hard metal, as brass, in which the soft-metal body is inclosed; and, third, a central pin, 7, of hard metal, the front end of which either terminates in a point acting as the firing-pin or as a carrier for the primer. This central pin, 7, is longer than the plunger 9 10, so that its rear end may project beyond the bottom of said plunger, while its front end is sunk, or nearly sunk, into the face of the body 9 of the plunger. The entire length of this compound part—i. e., the plunger and its central pin—is so calculated that when it is inserted in the fuse-case and the screw cap 4 is in place the point of the firing-pin 8 cannot touch the primer 5, and this relation of the central pin and plunger cannot be disturbed or the said parts be displaced without a considerable shock. The body or shank of the central pin, 7, is roughened by indentations, projections, or screw-threads, so as to afford a sufficient hold for the lead body 9 surrounding it to prevent its accidental displacement. At the moment of the discharge of the gun the plunger, in consequence of its inertia, slides rearward on its central pin until it strikes against the bottom of the fuse-case, the forward end of said central pin then standing above the inclosing soft-metal body, ready to be projected forward to bring the firing-pin and primer into percussive contact and cause the combustion of the latter. The force of this rearward movement of the plunger is so great as to produce a shock that will cause its lead body to close tightly around the central pin, and when the projectile then strikes against any obstacle the inertia of the plunger is overcome and the plunger is driven forward, carrying its central pin with it and bringing the firing-pin and primer into such forcible contact as to produce the explosion of the primer, the flame of which will ignite the powder-charge in the projectile.

The use of lead or other soft metal for the body of the plunger renders the same not liable to rebound, thus obviating any liability of explosion from that cause.

Proceeding now to a more detailed description of the fuse, the fuse illustrated by Figs. 1 to 5 and 8 will first be explained.

The fuse-case 19 is of cylindrical form, open at one end, and having an external thread, 29, cut in it, by means of which it may be attached to the butt-end of a projectile. The head 22 of the fuse-case is of a diameter somewhat larger than its cylindrical part, to prevent the fuse from being forced inward into the projectile at the moment of its discharge. This head is formed with straight sides, as in Fig. 5, to accommodate the jaws of a screw-wrench in the act of inserting the fuse in its seat in the projectile. A thin projecting lip or flange, 23, formed around the base of the head 22, serves as a gas-check by pressing it tightly against the metal of the projectile when the fuse is screwed in place and at the moment of the discharge. The front part of the fuse-case is closed by means of a screw-cap, 4, in a cavity of which is arranged the primer 5, the same being held in place by means of a small screw-plug, 6, that is perforated by one or more small holes drilled through the same, and which serve as passages for the flame of the consuming primer into the powder-chamber of the projectile. The central pin, 7, of the plunger in this instance is formed of steel or other suitable metal, to constitute its forward end a firing-pin, as 8. It is inclosed in the lead or other soft-metal body 9 of the plunger, said body 9 being confined by a jacket, 10, of brass or similar metal, that serves to prevent the lateral expansion of the lead body 9 against the inner walls of the fuse-case at the moment of discharge.

In order to hold the lead body and the central pin in their desired relative positions, the jacket 10 is drawn in at its ends, thus securing the soft-metal body 9 firmly in place.

The pin 7 is roughened either by cutting a thread on it or by forming other indentations or ridges in or on its surface, with which the surrounding soft metal of the body 9 engages to secure the said pin 7, as will presently appear. The forward end of the pin 7 is tapered to form the firing-pin 8, and is slightly sunk below the surface of the soft-metal body 9 of the plunger, while the rearward extremity of said pin 7 projects beyond the rear end of the plunger. The total length of the said plunger thus extended by the pin 7 is exactly equal to the longitudinal chamber of the fuse-case in which it is arranged when the cap 4 is screwed home.

In order to prevent the plunger as thus composed from turning in the fuse-case during the flight of the projectile to which the fuse is attached, and the rotary motion of which might otherwise cause the plunger to work forward on the pin 7, the said plunger is provided with a controlling-guide, whereby its proper longitudinal movement may be effected, while its rotary movement is prevented. Two forms of this guide are shown. One consists in a small lug, 11, that projects from the upper end of the plunger-case 10 and enters a guide-groove, 13, cut longitudinally in the inner surface of the fuse-case at the upper portion of its chamber. This groove is made only slightly longer than the rim of the plunger, so that if the latter should, through negligence or other cause, be inserted upside down, the screw-cap 4 could not be forced home, thus preventing the parts from being adjusted together in any other manner than in the proper working positions necessary to produce an effective fuse. The other form of controlling-guide consists in casting a pin, 14, into the metal body 9, so that said pin shall protrude from the rear end of the plunger, which pin enters a guide recess or hole, 15, provided in the head 22 of the fuse for its reception. (See Fig. 8.)

Upon the discharge of a projectile that is provided with this improved fuse with its parts in the positions shown in Fig. 1 the operation will be as follows: The plunger, in consequence of its inertia, which is opposed to the forward movement of the projectile, is forced rearward on the central pin, 7, until it strikes the bottom of the fuse-case chamber, thus bringing the rear end of said pin and that of the plunger into the same plane, so that both are seated upon the bottom of the fuse-case chamber. The power of this movement of the plunger is such as to cause its soft-lead body 9 to drag over the irregular surfaces of the pin 7, and its percussive force is such as to cause the lead body 9 to tightly close into, upon, or around the said pin as the plunger is arrested and seated upon the bottom of the fuse-chamber, and thus unite the pin 7 and plunger as a single body, as in Fig. 4. In order to prevent such a considerable compacting of the lead body 9, and such consequent lateral expansion of it as would burst the case or envelope 10 of the plunger, said body 9 is provided with a number of small holes or cavities, 12, (see Figs. 1, 2, 4, and 6,) or with a single one, which holes afford a space which the displaced metal must close before any undue strain will be exerted upon the fuse case or envelope. The parts are then disposed as in Fig. 4, with the firing-pin 8 projecting beyond the forward face of the plunger. The fuse is now armed, and the parts remain in that condition during the flight of the projectile. When, however, the projectile is suddenly arrested in its course by striking against any obstacle, the plunger is thrown violently forward, and its firing-pin 8 strikes a percussive blow upon the primer 5, causing the inflammation of the same, and the flame from the consuming primer passes through the holes in the screw-plug 6 into the powder-chamber of the projectile, the charge in which, becoming ignited, causes the projectile to burst.

In the modified form of this improved fuse shown in Figs. 6 and 7 the firing-pin 8 is attached to or projects from the screw-cap 4, that closes the forward end of the fuse-chamber, and the primer 5 is supported in the forward end of the central pin, 7, of the plunger. In this arrangement of the parts it is obvious that they will have the same relative operation ascribed to them in the foregoing description of the structure shown in Figs. 1 and 4, and that the flame from the consuming primer will pass through the holes 20 perforated through the screw-cap 4, alongside of the firing-pin 8, and enter the powder-chamber of the projectile.

The modification shown in Fig. 8 is a construction differing from that shown in Figs. 1 and 4 only in the structure of the screw-cap 4, which, in this instance, is formed with a cavity in its inner face for the primer 5, which primer, in the former instance, consists of a small casing filled with detonating material, and in the latter consists of a small quantity of such material compressed directly into its holding-cavity.

The structures shown in Figs. 9 to 13 are modified to adapt them for service in the forward or nose end of a projectile. To adapt the fuse to be so used but slight modification is required, the same consisting, principally, in providing a passage for the flame of the primer in a rearward direction to the charge-chamber of the projectile. This flame-passage is preferably formed by a hole, 1, drilled longitudinally through the central pin, 7, whether the same carries the primer 5, as in Figs. 9, 10, or the firing-pin 8, as in Fig. 13. In these modifications, Figs. 9, 10, 13, the front end of the fuse-chamber is provided with a removable cap or plug, 4, to provide for the introduction of the internal parts, which cap or plug 4 is a solid piece having an inwardly-projecting firing-pin, 8, when the central pin, 7, is to support the primer 5, as in Figs. 9 and 10; or, when said cap or plug is to support the primer, it may be made of one or two pieces to adapt it to be supplied with said primer, as in Figs. 13 or 8; but when the mode of holding the primer shown in Fig. 8 is adopted the flame-passage 2 will, of course, be closed.

In the modification of the fuse adapting it for use in the forward or nose end of the projectile the rearward or end wall of the fuse-case is perforated to provide a passage, as 3, whereby the flame from the consuming primer may pass into the charge-chamber of the projectile.

These modified forms of the fuse operate in the main precisely as has been described with respect to the forms shown in Figs. 1, 4, and 6. When the forward movement of the plunger is caused by the sudden arrest of the projectile, and the firing-pin and primer are brought into violent contact, and the inflammation of the latter is produced, its flame will be conducted rearward by the passage 1 in the central pin, 7, and thence through the flame passage or passages 3 into the charge-chamber of the projectile.

It is well understood that a fuse mounted in the nose or forward end of a projectile is liable to fail, for the reason that when the projectile strikes laterally, instead of with its point, an impact sufficient to cause a percussive blow of the plunger is not produced, while a fuse situated in the butt of the projectile almost invariably acts, even under such circumstances.

The production of a fuse adapted to be used effectively with the butt-end of a projectile, which is consummated by the construction constituting the present invention, enables the construction of shrapnel-shells to be much simplified, mainly by suppressing the central powder-canal, serving to direct the fire of the fuse at one end of the projectile to the powder-charge at the other end of the same, whereby a chamber of increased dimensions for the reception of the charge or filling of the projectile is obtained, as is readily apparent from the structures of shrapnel shown in Figs. 14 and 15.

The shell or case 24 of the projectile shown in Fig. 14 is cast in a single piece, with openings at its nose and butt for the reception of a closing-plug, 16, and the butt-fuse, respectively. The large chamber A, for the filling or shrapnel, consisting of the bullets 25 and supporting material 26, is an uninterrupted space separated from the powder-chamber B by means of a diaphragm, 17, cast with the shell or case 24 in such a manner as to provide it with a circular weak point, 38, that is strong enough to withstand the shock occasioned by the discharge of the gun, and yet weak enough to be readily fractured and blown forward by the ignition and explosion of the powder-charge. This diaphragm 17 has a central hole, 18, formed by the core in the operation of casting, which hole is so located as to be closed by one of the bullets with which the chamber A is ultimately filled.

The bullets 25 are introduced through the opening in the nose, as is the semi-plastic material 26, and the said opening is then closed by a screw-plug, as 16. The powder-charge is introduced into the chamber B through the opening in the butt for the fuse, and the projectile is rendered complete by screwing the fuse into this opening.

The projectile shown in Fig. 15 is constructed as follows: Its shell or case 24 is cast with a central chamber having a circular ledge or seat, 27, upon which a diaphragm, 17, of frangible material, rests, to separate the powder-chamber B from the shrapnel or filling chamber A, and the open forward end of the projectile is closed by means of a conical nose-piece, 28, that is screwed into the case or shell 24.

A projectile constructed as shown herein is, by reason of the absence of a flame-conductor connecting its nose end with the charge-chamber B, adapted to receive and carry a considerable greater quantity of shrapnel than shells of the same caliber as commonly constructed. This feature renders it possible to provide shrapnel-shells of small caliber with great destructive power, and thus render them greatly effective without increasing their dimensions longitudinally.

In order to protect the fuse from rupture or injury after it is fixed in place in the projectile, the base end of said projectile is provided with a projecting edge, 30, that provides a cavity in its base, and thus affords a projecting protecting-flange.

Having now fully described the improvements, what is claimed is—

1. In a percussion-fuse, a plunger composed of an external case of hard metal, a central pin of hard metal, and an interposed body of soft metal, substantially as described.

2. The combination, with the soft-metal body of the plunger, of the central pin, 7, having a roughened exterior, substantially as described.

3. A plunger for percussive fuses the body of which, that surrounds a hard-metal pin, as 7, is provided with a relieving-cavity, as 12, formed in its base, to prevent the same from expanding laterally against the walls of the fuse-chamber, substantially as described.

4. A bullet or shrapnel shell the interior of which is provided with powder and filling chambers transversely separated by a dividing diaphragm cast with a recess, that provides a weak point joining it to the main body of the shell, substantially as described.

In testimony whereof I have signed my name to this specification in the presence of two subscribing witnesses.

B. B. HOTCHKISS.

Witnesses:
ROBT. M. HOOPER,
DAVID FULLER.